United States Patent
Sankar et al.

(10) Patent No.: US 8,535,634 B2
(45) Date of Patent: Sep. 17, 2013

(54) IRON NITRIDE POWDERS FOR USE IN MAGNETIC, ELECTROMAGNETIC, AND MICROELECTRONIC DEVICES

(75) Inventors: Suryanarayan G. Sankar, Pittsburgh, PA (US); Satoru Simizu, Pittsburgh, PA (US); Brian J. Zande, Pittsburgh, PA (US); Richard T. Obermyer, Delmont, PA (US)

(73) Assignee: Advanced Materials Corporation, Pittsburgh, PA (US)

( * ) Notice: Subject to any disclaimer, the term of this patent is extended or adjusted under 35 U.S.C. 154(b) by 608 days.

(21) Appl. No.: 12/151,239

(22) Filed: May 5, 2008

(65) Prior Publication Data

US 2011/0059005 A1    Mar. 10, 2011

Related U.S. Application Data

(60) Provisional application No. 60/927,643, filed on May 4, 2007.

(51) Int. Cl.
*B32B 5/16* (2006.01)

(52) U.S. Cl.
USPC ............... 423/409; 428/822; 428/323

(58) Field of Classification Search
USPC .................. 423/409; 428/329
See application file for complete search history.

(56) References Cited

U.S. PATENT DOCUMENTS

| 4,133,678 | A | * | 1/1979 | Sarian et al. ............... 75/569 |
| 4,734,330 | A | * | 3/1988 | Oiyama et al. ............. 428/411.1 |
| 5,605,752 | A | * | 2/1997 | Matsubayashi ............. 428/323 |
| 2004/0247859 | A1 | * | 12/2004 | Sasaki et al. ............ 428/329 |
| 2005/0123754 | A1 | | 6/2005 | Masada et al. |
| 2005/0208320 | A1 | * | 9/2005 | Masada et al. ............. 428/570 |
| 2006/0131537 | A1 | | 6/2006 | Masada et al. |

FOREIGN PATENT DOCUMENTS

JP    11-081883    10/2000

OTHER PUBLICATIONS

Cadogan, J.M., Are there Giant Magnetic Moments in Fe-nitrides?, Aust. J. Phys., 1997, 50, 1093-1102, CSIRO Publishing, Australia.
Chen, S.K., et al., Magnetic Properties and Microstructure of Fe4N and (Fe,Ni) 4N, J. Appl. Phys, 70 (10), Nov. 15, 1991, 6247-49.
Jack, K.H., The Syntheses and Characterization of Bulk a"-Fe16N2, J. Alloys & Compounds, 222 (1995) 160-166.
Matar, S., Effets Chimiques et Magnetovolumiques Competitifs Dans Les Nitrures D'Insertion, C.R. Chimie 5 (2002) 539-546, Academie des Sciences.
Sawada, H., et al., Structural, Electronic, and Magnetic Properties of Fe16N2, Physical Review B, vol. 50, No. 14, Oct. 1, 1994—II, 10 004-008, The American Physical Society.

(Continued)

*Primary Examiner* — Melvin C Mayes
*Assistant Examiner* — Colette Nguyen
(74) *Attorney, Agent, or Firm* — David G. Oberdick; Peter J. Borghetti

(57) ABSTRACT

A method of making iron nitride powder is provided. The method comprises the steps of: a) providing an iron-based starting material; b) reducing the starting material by heating the starting material in a fluidized bed reactor in the presence of a reducing agent; c) nitriding the material obtained from step (b) by contacting the material with a nitrogen source. Also provided is the iron nitride powder made by the above method.

9 Claims, 6 Drawing Sheets

(56) References Cited

OTHER PUBLICATIONS

Sugita, Y., et al, Giant Magnetic Moment and Other Magnetic Properties of Epitaxially Grown Fe16N2 Single-Crystal Films (invited), J. Appl. Phys. 70 (10) Nov. 15, 1991, 5977-82.

Sugita, Y., et al., Magnetic and Electrical Properties of Single-Phase, Single-Crystal Fe16N2 Films Epitaxially Grown by Molecular Beam Epitaxy (invited). J. Appl. Phys. 79 (8), Apr. 15, 1996, 5576-81.

Sun, D.C., et al., Study on the Structure of Fe16N2 Single-crystal Films by Transmission Electron Microscopy, Thin Solid Films 298 (1997) 116-121.

Weber, T., et al. Search for Giant Magnetic Moments in Ion-beam-synthesized a"-Fe16N2, Thin Solid Films 279 (1996) 216-220.

* cited by examiner

IRON NITRIDE POWDERS FOR USE IN MAGNETIC, ELECTROMAGNETIC, AND MICROELECTRONIC DEVICES

CROSS-REFERENCE TO RELATED APPLICATION

This application claims priority to provisional application Ser. No. 60/927,643, filed May 4, 2007, incorporated by reference in its entirety.

GOVERNMENT CONTRACT

This invention was made with government support under small business research and development contracts for "Novel Approaches to Fabricate High Flux Density Magnetic Materials" awarded by the Naval Sea Systems Command (Contract No. N00024-06-C-4100) and for "Bulk Exchange-coupled Nitride Magnets" awarded by U.S. Army Research, Development and Engineering Command Acquisition Center (Contract No. W911NF-07-C-0097). The Government has certain rights to this invention.

FIELD OF THE INVENTION

This invention relates to an iron nitride magnetic powder suitable for use in magnetic, electromagnetic and microelectronic devices, and a method of producing the powder.

BACKGROUND OF THE INVENTION

For well over seventy years, attempts have been made by several workers to investigate the alloys belonging to Fe—N compositions and to synthesize $Fe_{16}N_2$ both in bulk and in thin film forms. Lehrer first reported magnetic measurements on Fe—N compositions. [E. Lehrer, Z. Elektrochem., 36, 460 (1930)] $Fe_{16}N_2$ was first identified by Jack in 1950 as precipitates in a matrix of nitrogen martensite that was obtained by quenching nitrogen austenite. [K. H. Jack, Proc. Roy. Soc. (London), A208, 216 (1951)] The $Fe_{16}N_2$ was found to form as a thin film on glass substrates by Kim and Takahashi and later on In—Ga—As substrates by Komura and co-workers. [T. K. Kim and M. Takahashi, Appl. Phys. Lett., 20, 492 (1972), M. Komura et al. J. Appl. Phys., 67, 5126 (1990)]. Despite attempts to refine Jack's method by several workers such as Wallace et al., and by Coey et al., $Fe_{16}N_2$ phase could not be formed as pure bulk form; significant secondary phases such as α-FeN and γ-FeN always were present in their materials. [M. Q. Huang et al., J. Magn. Magn. Mater., 135, 226 (1994) and J. M. D. Coey et al., J. Phys. Condens. Matter, 6, L23 (1994)].

Soft magnetic materials are known for use in electromagnetic devices. Typically, the magnetic material used for a core in such devices is selected from a soft magnetic material of high magnetic permeability such as silicon steel, magnetic metals, amorphous iron-based ribbons, pure iron powder, iron-based powder compositions, soft magnetic ferrites and the like. For example, magnetic materials such as iron, sendust, ferrosilicon, permalloy, supermalloy, iron-aluminum alloys, iron-cobalt alloys, manganese-zinc ferrites and nickel-zinc ferrites are used. Materials having high saturation magnetization are preferred, such as iron or iron-based compositions.

High performance soft magnetic materials with a large magnetic induction also play a role in advanced device development. The use of materials having improved magnetic induction over existing materials can provide significant weight reduction. The U.S. Navy is presently pursuing electromagnetic aircraft launch systems (EMALS). Such a system offers higher launch energy capability, as well as substantial improvements in areas other than performance. These include increased controllability, reliability, and efficiency.

The present EMALS design centers around a linear motor. At present, the linear motor is built using commercially available soft steel. Such a soft steel typically exhibits a saturation magnetization of 200 to 205 emu/g. A linear motor built using an iron nitride powder described in this invention as a precursor offers a significant weight savings compared to the motor built using commercially available soft steel. Other applications for the improved iron nitride include light-weight inductors, motors, actuators, and other microelectronics devices.

Masada et al., US Patent Publication 2005/0123754, describe a process to prepare an iron nitride powder substantially comprised of $Fe_{16}N_2$ and having a particle size of 50 nm or less. The powder is used as a magnetic layer in high-density magnetic recording media. Other uses for the powder are not described.

Masada et al., US Patent Publication 2005/0208320, disclose an iron nitride powder comprised primarily of $Fe_{16}N_2$ and having an average particle diameter of 20 nm or less and a standard deviation of the particle diameter of 14 nm or less. The powder is prepared using goethite having Al in solid solution for the starting iron oxide material. The powder is described as useful for magnetic materials in high density magnetic recording media. No other applications are described.

Masada et al., US Patent Publication 2006/0131537, disclose an iron nitride powder for use in high-density magnetic recording media, the powder being comprised of $Fe_{16}N_2$ particles to which particles of Si, P and/or Ti are adhered, and having a specific C/Fe atomic ratio.

The Masada patents disclose the use of a fixed bed reactor to make the powder. Further, the Masada patents are concerned with increasing coercivity of the iron powder, not increasing the magnetization, and only describe the use of iron nitride powder for magnetic recording applications.

SUMMARY OF THE INVENTION

Accordingly, the present invention provides a method of making iron nitride powder, the method comprising the steps of:
a) providing an iron-based starting material;
b) reducing the starting material by heating the starting material in a fluidized bed reactor in the presence of a reducing agent;
c) nitriding the material obtained from step (b) by contacting the material with a nitrogen source.

An iron nitride powder containing about 6 to 80 wt. % $Fe_{16}N_2$ and about 40 to 20 wt. % bcc iron having a saturation magnetization of between 230 and 250 emu/g is also provided. These and other aspects of the invention will become more readily apparent from the following drawings, detailed description and appended claims.

BRIEF DESCRIPTION OF THE DRAWINGS

The invention is further illustrated by the following drawings in which.

DETAILED DESCRIPTION OF THE INVENTION

Figure 1:
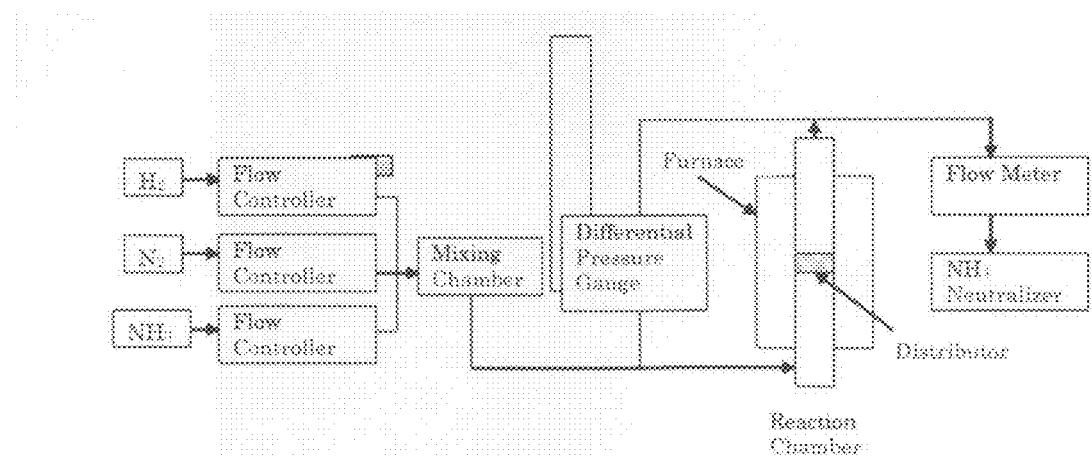
FIG. 1 is a diagram of a reaction control system to perform reduction and nitriding reactions.

Other than in any operating examples, or where otherwise indicated, all numbers expressing, for example, quantities of ingredients, temperature ranges or time periods used in the specification and claims are to be understood as being modified in all instances by the term "about". It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. In this application, the use of the singular includes the plural and plural encompasses singular, unless specifically stated otherwise. In addition, the use of "or" means "and/or" unless specifically stated otherwise, even though "and/or" may be explicitly used in certain instances.

The inventors have found that $Fe_{16}N_2$ can be formed by direct reaction of bcc (body centered cubic) iron powder and ammonia gas. Commercial grade nanocrystalline iron oxides supplied by Nanophase Technologies Corporation were used in the present invention as a precursor to prepare fine bcc iron powder. Iron oxyhydroxide produced by the methods described herein or other iron precursors such as iron oxalate can also be used.

To prepare the iron oxyhydroxide (FeO(OH)), dilute solutions of iron nitrate or iron sulphate and ammonium hydroxide are mixed at a temperature of about 70 to 80° C. The precipitated FeO(OH) is filtered and washed with distilled water to remove traces of the nitrate/sulphate ion. The FeO(OH) thus obtained is dried in an oven at a temperature of about 90-120° C., ground to a fine particle size and passed through a 400 mesh to obtain a powder with an average particle size of about 30 to 40 µm. Up to about 20 atomic % of cobalt or titanium may be introduced by addition of a proportionate amount of cobalt sulphate or nitrate or titanium chloride.

The reduction and nitrogenation (also known as nitriding) reactions are preferably carried out in a fluidized bed reactor to ensure that the gaseous reactants such as hydrogen, nitrogen and ammonia thoroughly react with the maximum amount of solid particles of iron oxyhydroxide, iron oxide and/or bcc iron during the reaction. Fluidized bed reactors are well known in the art. In this type of reactor, a fluid (gas) is passed through a granular solid material at high enough velocities to suspend the solid and provide complete mixing and a more uniform product. Thus, the reactions can be carried to their maximum extent. This is in contrast to a fixed bed reactor wherein the reaction between the solid powder and the flowing gaseous reactants may, in general, be not complete. Further, a fluidized bed can be readily scaled-up to produce larger quantities of the powder on an industrial scale and to promote a complete reaction between the iron oxyhydroxide, iron oxide or iron powder and the reactive hydrogen/nitrogen gases.

In one embodiment of the present invention, the above powder is placed in a fluidized bed reactor, after which a flow of hydrogen gas or other reducing agent is initiated. The reactor temperature is increased to about 350° to 500° C., preferably to between about 380° and 440° C. It is held at this temperature until the reduction is complete in about one to two hours. The rate of reduction is monitored by measuring the flow rate of hydrogen at the inlet and outlet of the reaction chamber. While the reducing reaction is taking place, the flow rate at the outlet is lower than that at the inlet because a part of the hydrogen gas is consumed to produce water. The water is captured by a cold trap and thus does not contribute to the outlet flow. Under these conditions at 1~1.1 atmosphere of pressure, the iron oxide used in the reaction or the iron oxyhydroxide which decomposes to iron oxide, is converted to bcc iron. A reaction control system to perform the reduction and nitriding is shown schematically in FIG. 1.

Any suitable reducing agent such as hydrogen gas or carbon monoxide can be used to prepare the α-Fe, although preferably, hydrogen ($H_2$) is used.

The furnace is then cooled down to a temperature between about 110° and 180° C. After the reactor attains a constant temperature, flow of hydrogen gas is stopped and a nitrogen source such as ammonia or a mixture of ammonia and nitrogen gas is started. Flow of ammonia or the mixture of ammonia and nitrogen is continued for about 1 to 48 hours, more preferably about 8 to 48 hours at a temperature between about 110° and 180° C., more preferably between about 120° and ° 170° C., most preferably 150-170° C.

When a combination of ammonia and nitrogen gas is used, the ammonia component of the mixture is between 5-100% by volume, more preferably between 20-100% of the mixture.

Pressure during the nitriding step is held between 1~1.1 atmosphere.

After a preset period of time, typically between 1 and 20 hours, more preferably 16-20 hours, the reactor is taken out of the furnace and cooled to room temperature. The flow of ammonia gas is terminated and the flow of nitrogen gas is increased to an appropriate level, typically 500 sccm. Air is let into the sample zone typically at a rate of 5 sccm to passivate the surface of the powder. Then the reactor vessel assembly is opened and the powder unloaded for subsequent testing.

The methods of the present invention produce a powder containing bcc iron and $Fe_{16}N_2$. The magnetic moment of the powder at room temperature and at an external field of 16 kOe is greater than about 200 emu/gram, more preferably up to about 230 emu/gram. An iron nitride powder produced by the methods of the present invention and containing about 60 to 80 w % $Fe_{16}N_2$ and about 40 to 20 w % bcc iron will have a saturation magnetization of between about 200 and 250 emu/g, more preferably between about 230 and 250 emu/g.

Samples can be characterized by (a) powder x-ray diffraction and neutron diffraction patterns to determine the phase purity, (b) magnetization versus external field (from 0 to 16.5 kOe) to obtain saturation magnetization, (c) magnetization versus external field (from 0 to −2 kOe) to obtain coercivity, (d) magnetization versus temperature in an external field (~200 to 500 Oe) to determine phase transitions and the presence of secondary magnetic phases and (e) Mossbauer spectroscopy to determine the hyperfine field.

The concentrations of the phases in the nitrided products were estimated from characteristic line intensities of the X-ray and neutron diffraction patterns and from supporting information of thermo-magnetic curves (i.e., from the Curie temperature of the phases). Representative results are shown in Table 1 along with flow conditions, reaction temperature and period of the reactions.

Figure 2:
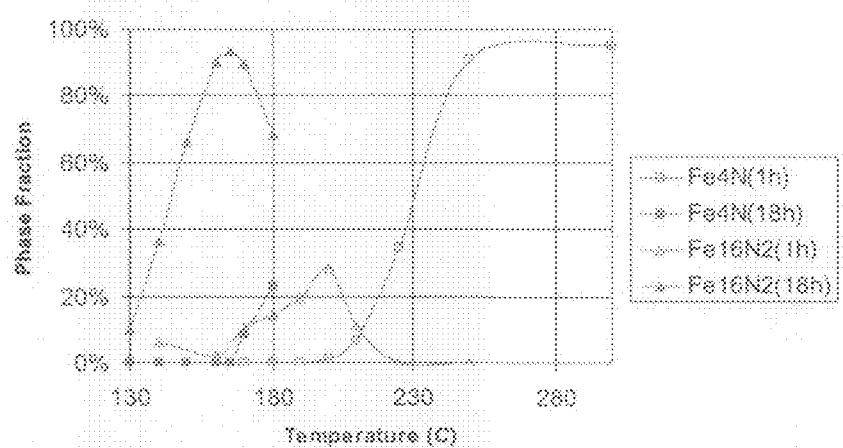
FIG. 2 is a graph of the relative concentration of $Fe_4N$ and $Fe_{16}N_2$ phases as a function of nitriding temperature. Results for one hour (open symbols) and 18 hours (solid symbols) of nitriding are shown. The balance is bcc-iron.

Although conventional wisdom and the vast amount of accumulated literature of iron-nitrogen systems dictated that nitrogen has a very limited solubility in bcc iron, this invention has shown that large amounts of nitrogen can be incorporated into bcc iron at as low a temperature as about 130° C. This may be attributed to the reactor design, the manner in which bcc iron is prepared in the reactor, particularly precise monitoring of the reduction process by measuring the reducing gas flow at the inlet and outlet of the reactor and the method employed to synthesize iron nitride using ammonia or ammonia nitrogen mixture. Reactive nitrogen is produced when ammonia is decomposed either on its own or in combination with nitrogen. With the above changes, nearly 100% pure $Fe_{16}N_2$ can be formed. However, depending on the preparative conditions, $Fe_{16}N_2$, $Fe_4N$ and bcc iron are obtained in varying concentrations. FIG. 2 shows the relative concentration of $Fe_{16}N_2$ and $Fe_4N$ in the reaction products under varied nitriding conditions. When the period for nitriding is for one hour, the temperature is the dominant factor to determine the phase composition. At 300° C., $Fe_4N$ is the dominant phase and $Fe_{16}N_2$ does not form. When the temperature is reduced to about 180° C., formation of $Fe_4N$ is suppressed and more than 10% of the sample is $Fe_{16}N_2$ with balance bcc iron. The $Fe_4N$ still forms at 180° C. if nitriding is extended for 18 hours. Nearly single phase sample of $Fe_{16}N_2$ can be formed by nitriding at about 160° C. for about 18 hours.

Figure 3:
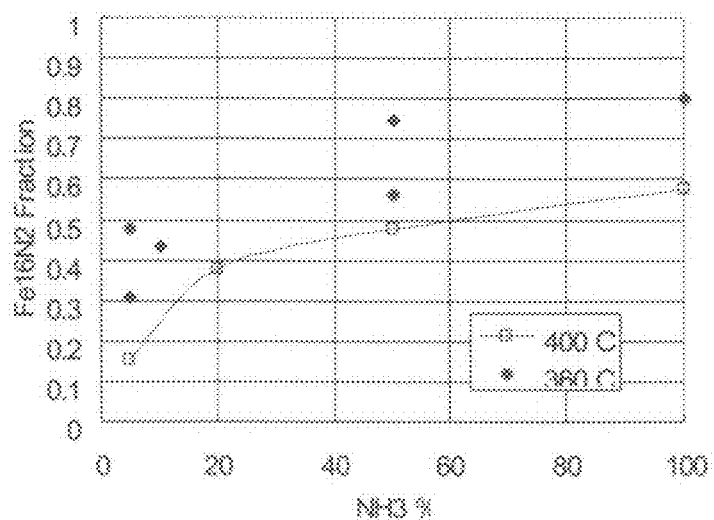
FIG. 3 is a graph of the relative concentration of $Fe_{16}N_2$ shown as a function of ammonia concentration (diluted by nitrogen) in the nitriding gas when nitrided at 160 C for 18 hours. The data is separated based on the reduction temperature: 400 C and 360 C.

As illustrated in FIG. 3, the formation of $Fe_{16}N_2$ phase is also affected by the reduction temperature and the concentration of ammonia gas when it is diluted by nitrogen. This appears to be a result of the crystal growth of the bcc iron that follows the reduction. Such a growth tends to increase the magnetic moment of the processed product. At the same time, it hinders nitriding. For this reason, it is important to monitor the reduction and detect the end of reduction so that the nitriding may be started without undue delay.

Magnetic properties such as (a) measured magnetization in an external field of ~16.5 kOe, (b) saturation magnetization and (c) coercivity also vary with changes in preparative conditions. Representative results of measured magnetization at an applied field of 16 kOe, saturation magnetization, and coercivity are provided in Table 2. The powder composition in each sample has a balance of bcc iron, not shown in the table.

Figure 4:
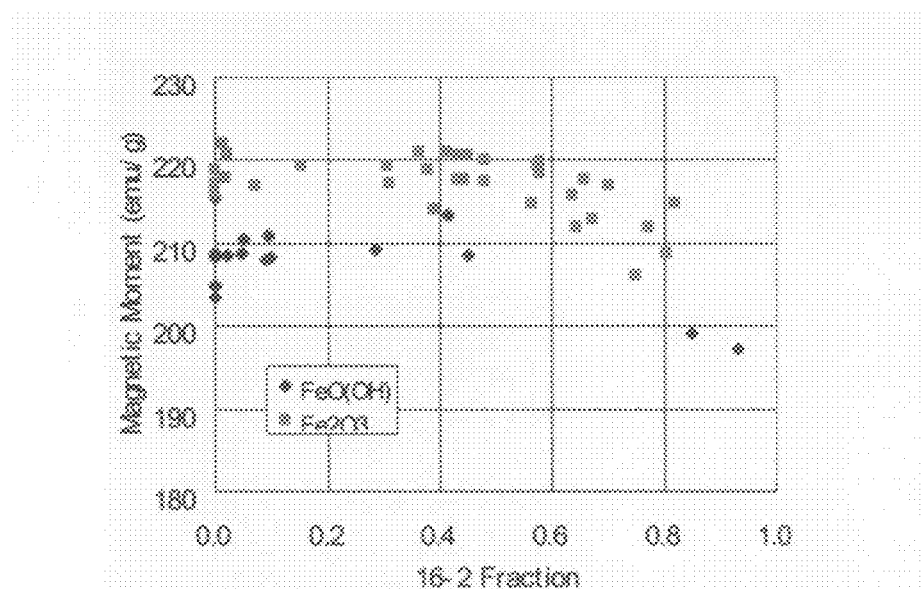
FIG. 4 is a graph of magnetic moment (at 16 kOe) of the nitrided products as a function of the relative fraction of $Fe_{16}N_2$ phase.
Figure 5:
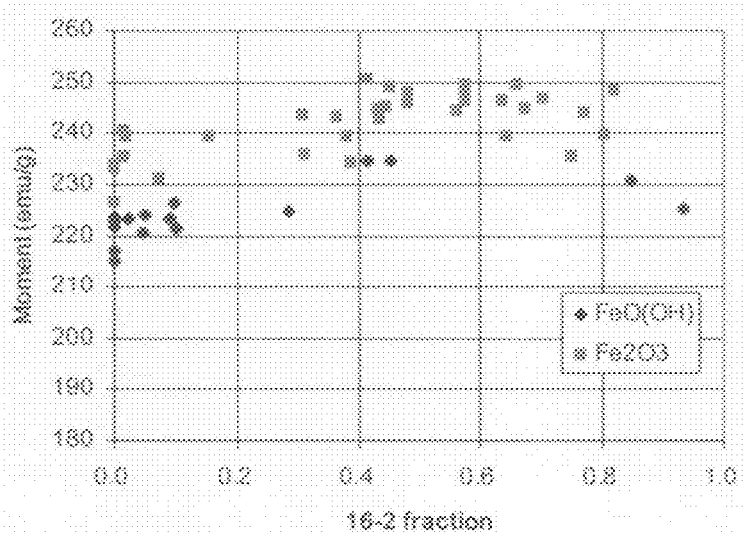
FIG. 5 is a graph of saturation moment of the nitrided products as a function of the relative fraction of $Fe_{16}N_2$ phase.
Figure 6:
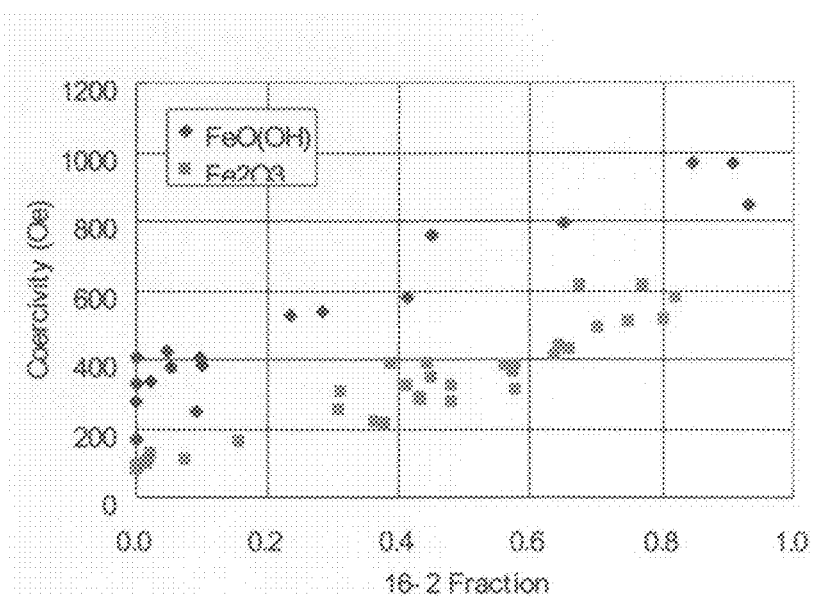
FIG. 6 is a graph of coercivity of the nitrided products as a function of the relative fraction of $Fe_{16}N_2$ phase.
Figure 7:
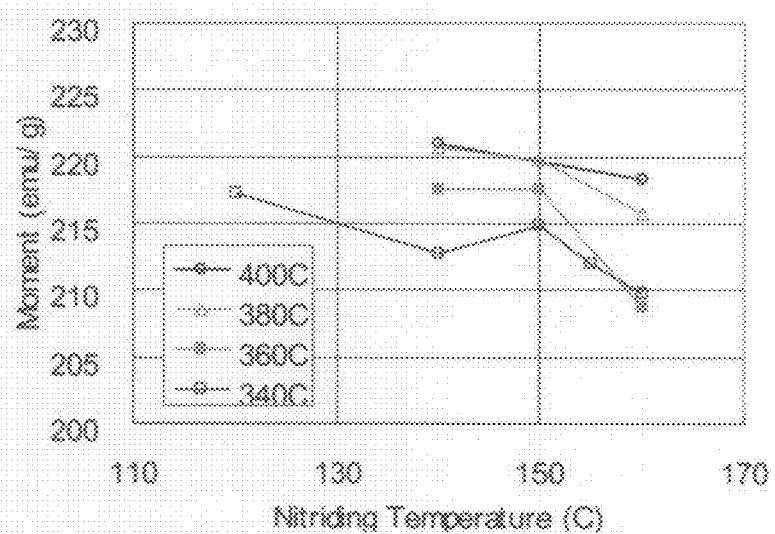
FIG. 7 is a graph of magnetic moment (at 16 kOe) of the nitrided products as a function of nitriding temperature.
Figure 8:
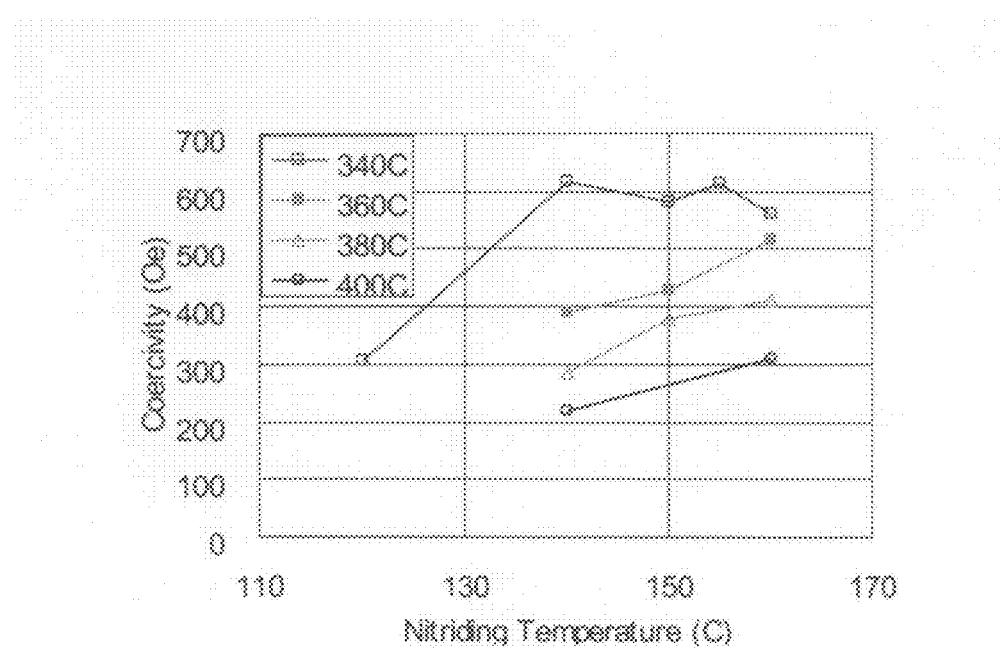
FIG. 8 is a graph of coercivity of the nitrided products as a function of nitriding temperature.
Figure 9:
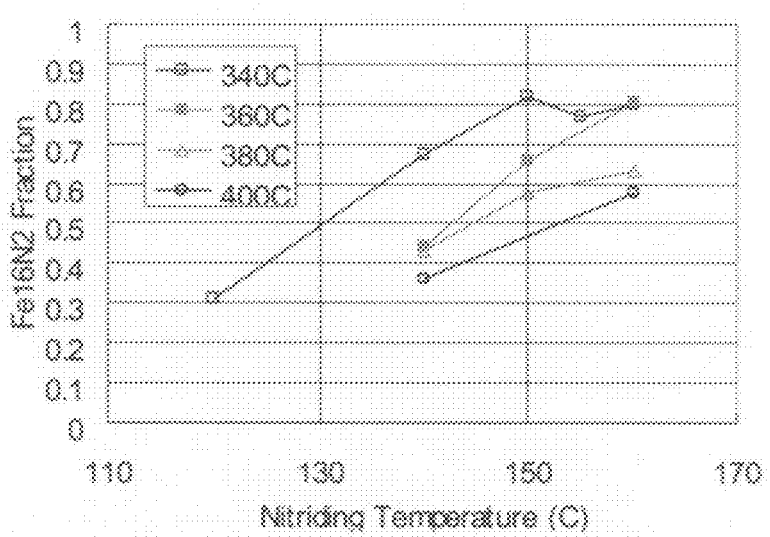
FIG. 9 is a graph of relative fraction of $Fe_{16}N_2$ phase in the reaction products as a function of nitriding temperature.

FIGS. 4, 5, and 6 show the variation of magnetization measured at 16 kOe, saturation magnetization and coercivity, respectively, as a function of the relative concentration of the $Fe_{16}N_2$ phase. These figures show that the magnetic moment and coercivity of the powders prepared by the methods of the present invention are in the range of about 200 to 250 emu/g and 100 to 1000 Oe, respectively. The saturation moment estimated by extrapolation to infinite magnetizing field is as high as 250 emu/g. FIGS. 7, 8, and 9 show that powders with saturation magnetization higher than ~215 emu/g are obtained when the nitrogenation experiments are carried out at temperatures between 140° C. and 160° C. and that powders with coercivities below 400 Oe are obtained when the nitrogenation experiments are carried out at temperatures between 140° C. and 160° C. on bcc iron reduced between 380° C. and 400° C. The relative fraction of the $Fe_{16}N_2$ phase in the reaction product is between 40~60%.

Figure 10:
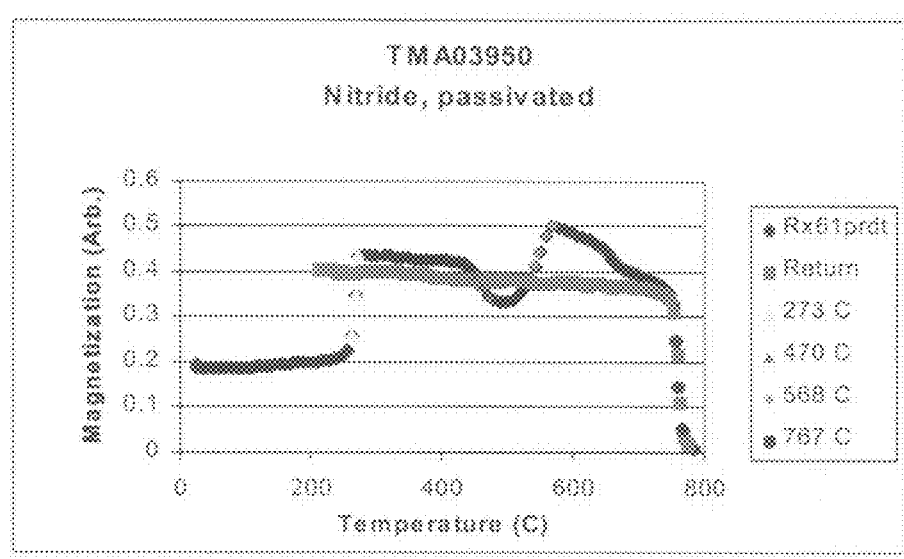
FIG. 10 is a graph of the thermo-magnetic analysis of the sample from Run 61.

Thermomagnetic analysis (TMA) of the samples at low external fields (~500 Oe and below) show a transition at a temperature between about 220° and 280° C. An example is shown in FIG. 10. This transition arises due to a phase change from $Fe_{16}N_2$ to $Fe_4N$. There is a small increase in relative magnetization accompanying this phase change. Based on the relative concentration of the bcc iron and $Fe_{16}N_2$, the magnitude of this increase in magnetization varies. A linear relationship holds between the relative increase in magnetization and the fraction of $Fe_{16}N_2$. This provides a simple means to determine the relative concentration of the $Fe_{16}N_2$ phase.

The material derived from the method of the present invention can be used as a material in one or more of the following applications: EMALS, inductors, power transformers, motors, actuators, microwave devices and magnetic recording devices.

EXAMPLES

The invention is further illustrated by the following non-limiting example.

Method:

Gamma phase iron oxide powder from Nanophase Technologies Corporation with an average particle size of 30 nm is used as a starting material. Also, iron oxide obtained from iron oxyhydroxide is used as a starting material. An aqueous solution of iron nitrate was prepared by dissolving 260 g of iron nitrate in 2600 ml of distilled water in a glass beaker. This was heated to 70° C. About 600 ml of 15% ammonia in water was slowly added to the above iron nitrate solution under constant stirring. Iron oxyhydroxide precipitates from this solution. It was allowed to settle. The liquid was poured out and the remaining precipitate was washed until neutral pH was observed in the washed water. This was enough to remove traces of the nitrate ions from the precipitate. The precipitate was then filtered and dried at 85 to 95° C. in air. About 200 g of iron oxyhydroxide was prepared in this manner.

About 2 to 5 grams of the iron oxide or oxyhydroxide powder is loaded into a fluidized reactor. It is heated under flowing hydrogen which acts as a reducing agent. Reduction is performed at temperatures between about 350 and 500 degrees C. until the hydrogen gas flow at the inlet and outlet of the reactor matches, indicating completion of the reducing reaction.

The furnace is then cooled down to a temperature between 110° and 180° C. The sample is then reacted with ammonia or a mixture of ammonia and nitrogen at flowing rates controlled typically at 5~50 sccm (cubic centimeter per minute at standard temperature pressure) of ammonia and 0~100 sccm of nitrogen to achieve a desired ammonia concentration in volume between 5~100% for a period varying between about 1 and 48 hours.

The sample is then cooled to room temperature. The surface of the product is passivated by reacting it with a flash of air, i.e., when the sample reaches room temperature or a temperature below 50° C., flow of ammonia is stopped and flow of nitrogen is increased typically to 500 sccm and air is allowed into the reactor typically at a rate of 5 sccm. This passivates the surface of the particles and prevents oxidation of the entire particle from taking place. The product is then removed from the reactor.

Characterization:

The powder is characterized using a powder x-ray diffractometer to determine the nature and amount of crystalline phases.

About 20 to 50 mg. of the powder is loaded into a vibrating sample magnetometer. The magnetization is measured at room temperature in external fields up to ~16.5 kOe.

Saturation magnetization is determined by plotting a magnetization curve as a function of an inverse of magnetizing field and extrapolating a linear part of the magnetization curve (between 10 and 16.5 kOe) toward an inverse of an infinite magnetizing field. Magnetization of the powder is also measured between room temperature and 800° C. to determine the secondary magnetic phases.

$Fe_{16}N_2$ phase exhibits a sharp increase in magnetization at 240° C. (See FIG. 10.) Above this temperature, $Fe_{16}N_2$ converts into $Fe_4N$; this is confirmed by determining the x-ray diffraction patterns.

Neutron diffraction and Mossbauer measurements were carried out to confirm the presence of the $Fe_{16}N_2$ phase. Table 3 shows the relative fraction of $Fe_{16}N_2$ phase for three selected samples determined by neutron diffraction. The results show good agreement with the values determined by x-ray diffraction as well as by thermomagnetic analysis (TMA). The Mossbauer spectrum for one selected sample shows one set of peaks that is characteristic of bcc-iron and three sets of peaks that are characteristic of $Fe_{16}N_2$. The hyperfine fields determined by best fit to the spectrum are 331 kOe for bcc-iron and 404 kOe, 317 kOe, and 295 kOe for three crystallographic Fe sites of $Fe_{16}N_2$. The saturation magnetization of samples containing ~60 to 80% $Fe_{16}N_2$ and ~40 to 20% bcc iron (by weight) is higher than 230 emu/g., about 250 emu/g and possibly higher.

What is claimed is:

1. A method of making iron nitride powder, the method comprising the steps in the following sequential order:
    a) providing FeOOH starting bulk material in a reactor;
    b) separating the FeOOH starting bulk material into a plurality of individual particles such that an individual particle of the plurality of particles is suspended in the reactor by flowing a reducing agent in the reactor, wherein an entire surface of the individual particle is exposed to gas flowing in the reactor;
    c) maintaining an elevated temperature in the reactor of between about 350° C. and 500° C. in the presence of the reducing agent to reduce the individual particle to form a reduced individual particle;
    d) cooling down the elevated temperature in the reactor to a constant temperature of between 110° C. and 180° C. in the presence of the reducing agent;
    e) stopping flow of the reducing agent after reaching the constant temperature;
    f) flowing a nitrogenation gas with an ammonia gas and a nitrogen gas to suspend the reduced individual particle in a fluidized environment and maintaining the constant temperature in the fluidized environment from about 1 hour up to about 48 hours to nitride the reduced individual particle to form an iron nitride particle of the iron nitride powder;
    g) cooling down the constant temperature in the reactor between room temperature and 50° C. to define a passivating temperature;
    h) stopping flow of ammonia gas after reaching the passivating temperature; and
    i) exposing an entire surface of the iron nitride particle of the iron nitride powder to an air and nitrogen gas mixture to passivate the entire surface of the iron nitride particle to prevent oxidation, whereby the iron nitride powder having (i) a saturation magnetization of between 230 and 250 emu/g as determined by plotting a magnetization curve as a function of an inverse of magnetizing field and extrapolating a linear part of the magnetization curve from 10 kOe to 16 kOe toward an inverse of an infinite magnetizing field, (ii) 4 to 90 wt % Fe16N2, (iii) 0 wt % Fe4N, and (iv) remaining balance of the iron nitride powder being body centered cubic (bcc) iron.

2. The method of claim 1, wherein the reducing agent is selected from the group consisting of hydrogen and carbon monoxide gas.

3. The method of claim 1, wherein the FeOOH starting material further comprises cobalt (0-20 atomic %) and/or titanium (0-20 atomic %).

4. The method of claim 1, wherein the step (b) further comprises the step of monitoring the reducing agent flow rate at an inlet and an outlet of the reactor to assure reduction of the FeOOH starting material is completed.

5. The method of claim 1, wherein the step (c) is carried out at a pressure greater than 1 atmosphere to covert a portion of the FeOOH starting material to body centered cubic (bcc) iron.

6. A method of making iron nitride powder, the method comprising the steps in the following sequential order:
    a) providing Fe2O3 starting bulk material in a reactor;
    b) separating the Fe2O3 starting bulk material into a plurality of individual particles such that an individual particle of the plurality of particles is suspended in the reactor by flowing a reducing agent in the reactor, wherein an entire surface of the individual particle is exposed to gas flowing in the reactor;
    c) maintaining an elevated temperature in the reactor between 340 to 440° C. in the presence of the reducing agent to reduce the individual particle to form a reduced individual particle;
    d) cooling down the elevated temperature in the reactor to a constant temperature of between 120° C. to 160° C. in the presence of the reducing agent;
    e) stopping flow of the reducing agent after reaching the constant temperature;
    f) flowing a nitrogenation gas with an ammonia gas and a nitrogen gas to suspend the reduced individual particle in a fluidized environment and maintaining the constant temperature in the fluidized environment for a period of 18 to 66 hours to nitride the reduced individual particle to form an iron nitride particle of the iron nitride powder;
    g) cooling down the constant temperature in the reactor between room temperature and 50° C. to define a passivating temperature;
    h) stopping flow of ammonia gas after reaching the passivating temperature; and
    i) exposing an entire surface of the iron nitride particle of the iron nitride powder to an air and nitrogen gas mixture to passivate the entire surface of the iron nitride particle to prevent oxidation, whereby the iron nitride powder having (i) a saturation magnetization of between 230 and 250 emu/g as determined by plotting a magnetization curve as a function of an inverse of magnetizing field and extrapolating a linear part of the magnetization curve from 10 kOe to 16 kOe toward an inverse of an infinite magnetizing field, (ii) 4 to 90 wt % Fe16N2, (iii) 0 wt % Fe4N, and (iv) remaining balance of the iron nitride powder being body centered cubic (bcc) iron.

7. The method of claim 6 wherein the reducing agent is selected from the group consisting of hydrogen and carbon monoxide gas.

8. The method of claim 6, wherein the step (b) further comprises the step of monitoring the reducing agent flow rate at an inlet and an outlet of the reactor to assure reduction of the $Fe_2O_3$ starting material is completed.

9. The method of claim 6, wherein the step (c) is carried out at a pressure greater than 1 atmosphere to covert a portion of the $Fe_2O_3$ starting material to body centered cubic (bcc) iron.

* * * * *